United States Patent [19]
Brucker et al.

[11] 3,800,045
[45] Mar. 26, 1974

[54] LOWER CALORIE CANDY

[75] Inventors: Clarence E. Brucker, Oak Park; Kenneth S. Uhlarik, Broadview; John W. Lampe, Jr.; John W. Bush, both of Chicago, all of Ill.

[73] Assignee: American Home Products Corporation, New York, N.Y.

[22] Filed: Apr. 8, 1971

[21] Appl. No.: 132,544

[52] U.S. Cl. .............................. 426/162, 426/214
[51] Int. Cl. ................................................ A23g 3/00
[58] Field of Search .......... 99/134 R, 134 A, 134 G, 99/1

[56] References Cited
UNITED STATES PATENTS
3,023,104  2/1962  Battista ............................ 99/134 R OTHER PUBLICATIONS
Food Processing "Putman Food Awards" July, 1971.

*Primary Examiner*—A. Louis Monacell
*Assistant Examiner*—J. M. Hunter
*Attorney, Agent, or Firm*—Joseph Martin Weigman; Andrew Kafko

[57] ABSTRACT

A reduced calorie candy is described characterized by the substitution of about 11 to 28 percent gum arabic, 18 to 26 percent of microcrystalline cellulose, and about 20 percent high fructose content sweetener for a portion of the sweetened, condensed skim milk, and vegetable fat usually used in such compositions. Calorie reduction of over 55 percent may be obtained without loss of the texture or flavor of high calorie candy.

1 Claim, No Drawings

LOWER CALORIE CANDY

This invention relates to reduced calorie compositions for candy and more particularly relates to compositions for candy which contain up to about 58 percent fewer calories than usual candy compositions without the loss of texture and flavor of full calorie candy. The application is particularly directed to toffee, caramel, and fudge type products.

The reduced calorie candies that have been known up to the present time are of the "dietetic candy" type. Dietetic candy typically contains no sugar but utilizes substitutes, such as saccharin and sodium cyclamate or calcium cyclamate in its place. Dietetic candy typically has a texture and a flavor noticeably different from that of high calorie candy, because the sugar in candy, as well as flavoring the composition, imparts a texture, or body to it. The sugar substitutes do not impart the mouth feel, viscosity or bodying properties of sugar to the candy.

Frequently there is a considerable loss in bulk when artificial sweeteners replace carbohydrates in a food formulation. It is known to add various hydrophilic colloids together with sweeteners in an attempt to correct the deficiency. Compounds known to be useful in the control of "texture" of the product include carboxymethylcellulose, alginates, gelatin, carrageenin, arabinogalactan and the like. However, no composition has been known to date which has the same bodying, bulking, and other physical and organoleptic properties of candy which at the same time achieves a reduction in calorie content.

Further, some authorities consider it desirable to limit the amount of artificial sweeteners ingested.

It is an object of the present invention to provide a candy composition which has a reduced calorie content but has the texture, mouth feel, bodying properties, bulking properties, and other physical and organoleptic properties of high calorie candy.

It is a further object of this invention to provide a reduced calorie candy composition containing no artificial sweeteners.

The object of the present invention may be achieved by the substitution of about 11 to 28 percent by weight of the total composition of gum arabic, about 18 to 26 percent microcrystalline cellulose, and about 20 percent of a high fructose sweetener content for a portion of the sweetened, condensed skim milk, and vegetable fat usually used in many candy compositions.

It has been found in compositions containing sweetened condensed skim milk, corn syrup and vegetable fat that, by the proper selection of the amount of the ingredients substituted, the calorie content may be reduced up to about 58 percent without affecting the texture of the product.

In determining a toffee formulation not using cyclamates or saccharin as sweeteners, it was deemed necessary to establish upper usage levels for the non-nutrients gum arabic and microcrystalline cellulose, in such a product. A type of cellulose which does not contain carboxymethyl cellulose was used and was commercially available as Avicel pH. It was found possible to use a higher level of filler with no grittiness encountered at any level otherwise acceptable.

In general, it was found that the total amount of non-nutrient present in the product was a critical factor and, surprisingly, not the relative amount of either of the two non-nutrients considered separately. Several samples were made using a base identical to a toffee formulation currently used in production. In each instance, the ratio of the two non-nutrients was set and the combination used at a rate which gave some desired total non-nutrient content of the product on a dry basis.

The total non-nutrient level has a maximum allowable value and there was also found an upper limit for each of the contributing ingredients. Exceeding the limit for cellulose gives a product which is chalky in nature and does not retain moisture satisfactorily. Exceeding the limit for gum arabic results in a tough fibrous product which is aesthetically undesirable and mechanically unworkable. Increasing the total amount of non-nutrient beyond a maximum value, even while maintaining each of the two substituents within an acceptable range, gives a product which has reduced flavor. The values which have been found to be upper limits are given below as percent of solids in the product:

Total non-nutrient = 46 percent

Total Microcrystalline cellulose = 26 percent

Total gum arabic = 28 percent

In a product with 14 percent moisture content the 46 percent non-nutrient level was found to give a calorie reduction of 56.8 percent as compared to the regular toffee formulation (175 calories per 100 grams vs. 405 calories per 100 grams).

In addition to these data, another fact was found from these tests. As the ratio of one non-nutrient to the other was varied, a range of product types is produced, that is, when the Avicel: gum arabic ratio was 70:30 a fudge type product resulted. As the ratio approached 50:50 and up to at least 30:70, a more chewy, but not typically caramel-like substance was made. Above this level within the limits for gum arabic, a distinctly gum substance was made. At some intermediate point (depending on subjective values) a caramel-like product was the result.

The high fructose sweetener used is a newly developed starch hydrolyzate which is sweeter than any other corn sweetener currently available and is available from Clinton Corn Processing Company, Clinton, Iowa, under the name "Isomerose 30." The carbohydrate components of Isomerose 30 are: monosaccharides 57% (fructose 14%, dextrose 43%), disaccharides 31%, higher saccharides 12%. Fructose is a carbohydrate having almost twice the sweetness of sucrose.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE I

The following example illustrates the maximum acceptable level of microcrystalline cellulose in lower calories.

Chocolate toffee products were prepared substituting various amounts of gum arabic and microcrystalline cellulose, and a high fructose sweetener for the sweetened condensed skim milk, and vegetable fat used in the usual high calorie toffee compositions. The formulas are shown in Table 1, where the ingredients are given in percent by weight on a "finished basis." The "finished basis" is the candy as available to the consumer. Gum arabic at 50% identifies an aqueous solution containing 50 pounds of gum arabic in each 100 pounds of solution.

TABLE 1

Comparative Candy Compositions

| | Control | Batch A |
|---|---|---|
| Gum arabic at 50% | None | 9.5 |
| Microcrystalline cellulose | None | 22.3 |
| High fructose sweetener | None | 19.3 |
| Sugar | 6.2 | 5.0 |
| Chocolate | 2.4 | 4.0 |
| Salt | 0.4 | 0.6 |
| Defatted cocoa powder | 1.4 | 0.9 |
| Sweetened condensed skim milk | 35.4 | 20.6 |
| Corn syrup | 34.6 | None |
| Vegetable fat | 10.1 | 3.2 |
| Flavoring | 0.5 | 0.6 |
| Water | 9.0 | 14.0 |

The calorie content of each of the batch was calculated based on calorie values as described in "Composition of Foods" by B. K. Watt and A. L. Merrill, Agricultural Handbook No. 8, Consumer and Food Economics Research Division, United States Department of Agriculture, Revised December, 1963, Superintendent of Documents, United States Government Printing Office, Washington, D. C. The results are shown in Table 2.

TABLE 2

CALORIE CONTENT

| | Control | Batch A |
|---|---|---|
| Calories per 100 grams | 407 | 205 |
| Reduction in Calories | — | 49.6% |

EXAMPLE II

The following example illustrates the maximum acceptable level of total non-nutrients in lower calorie candy compositions.

Chocolate toffee products were prepared substituting various amounts of gum arabic and microcrystalline cellulose, and a high fructose content sweetener for the sweetened condensed skim milk, corn syrup and vegetable fat in the usual high calorie toffee compositions. The formulas are shown in Table 3, where the ingredients are given in percent by weight on a "finished basis."

TABLE 3

Comparative Candy Compositions

| | Control | Batch B |
|---|---|---|
| Gum arabic at 50% | None | 23.2 |
| Microcrystalline cellulose | None | 15.5 |
| High fructose sweetener | None | 16.1 |
| Sugar | 6.2 | 4.2 |
| Chocolate | 2.4 | 3.4 |
| Salt | 0.4 | 0.5 |
| Defatted cocoa powder | 1.4 | 0.8 |
| Sweetened condensed skim milk | 35.4 | 17.3 |
| Corn Syrup | 34.6 | None |
| Vegetable Fat | 10.1 | 2.7 |
| Flavoring | 0.5 | 0.4 |
| Water | 9.0 | 16.0 |

The calorie content of each of the batches was calculated as described in Example I. The results are shown in Table 4.

TABLE 4

CALORIE CONTENT

| | Control | Batch B |
|---|---|---|
| Calories per ounce | 407 | 171 |
| Reduction in calories | — | 58% |

Based on the results of the experimentation it was determined that a reduced calorie candy composition may have the following composition:

A. One to 25 percent gum arabic;
B. One to 25 percent microcrystalline cellulose;
C. One to 20 percent high fructose content sweetener;
D. 15 to 22 percent sweetened, condensed skim milk;
E. Two to 5 percent vegetable fat; and
F. Flavoring and the like along with other ingredients normally present in a candy composition.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A reduced calorie candy composition comprising:

| INGREDIENTS | PERCENT BY WEIGHT |
|---|---|
| A. Gum arabic | 9.5–23.2 |
| B. Microcrystalline cellulose | 15.5–22.3 |
| C. High fructose content sweetener | 16.1–19.3 |
| D. Sugar | 4.2–5.0 |
| E. Sweetened condensed skim milk | 17.3–20.6 |
| F. Vegetable fat | 2.7–3.2 |
| G. The remainder being water, flavoring | |

* * * * *